(12) United States Patent
Saha et al.

(10) Patent No.: US 12,381,793 B2
(45) Date of Patent: Aug. 5, 2025

(54) SYSTEMS AND METHODS FOR PREDICTING UNDETECTABLE FLOWS IN DEEP PACKET INSPECTION

(71) Applicant: SAMSUNG ELECTRONICS CO., LTD., Suwon-si (KR)

(72) Inventors: Ankan Saha, Karnataka (IN); Uday Trivedi, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/865,443

(22) Filed: Jul. 15, 2022

(65) Prior Publication Data
US 2023/0026463 A1 Jan. 26, 2023

(30) Foreign Application Priority Data
Jul. 15, 2021 (IN) .............................. 202141031770
Jul. 4, 2022 (IN) .............................. 202141031770

(51) Int. Cl.
*H04L 43/028* (2022.01)
*G06N 7/01* (2023.01)
*H04L 41/16* (2022.01)

(52) U.S. Cl.
CPC ............. *H04L 43/028* (2013.01); *G06N 7/01* (2023.01); *H04L 41/16* (2013.01)

(58) Field of Classification Search
CPC .......... H04L 43/028; H04L 41/16; G06N 7/01
See application file for complete search history.

(56) References Cited

U.S. PATENT DOCUMENTS

| | | | |
|---|---|---|---|
| 2011/0040706 A1* | 2/2011 | Sen ........................ | G06N 20/00 706/12 |
| 2013/0007286 A1* | 1/2013 | Mehta ................... | H04W 76/10 709/227 |
| 2017/0099310 A1* | 4/2017 | Di Pietro ............ | H04L 63/1425 |
| 2017/0214702 A1* | 7/2017 | Moscovici .......... | H04W 12/106 |
| 2020/0366689 A1* | 11/2020 | Lotia ................... | H04L 63/1483 |
| 2021/0026863 A1* | 1/2021 | Mordani ................. | G06F 7/14 |
| 2021/0273949 A1* | 9/2021 | Howlett ............. | H04L 63/1416 |
| 2022/0070183 A1* | 3/2022 | Goyal ................ | H04L 63/0236 |
| 2022/0128985 A1* | 4/2022 | Szigeti ............... | G05B 23/0256 |
| 2022/0413458 A1* | 12/2022 | Lovegrove ............ | H04L 67/125 |

* cited by examiner

*Primary Examiner* — Benjamin H Elliott, IV
*Assistant Examiner* — Tracy Lauren Colbert
(74) *Attorney, Agent, or Firm* — Nixon & Vanderhye P.C.

(57) ABSTRACT

Wireless communications and/or systems (e.g., 100) and/or methods (e.g., 200, 300, 400) may be provided for predicting of potential undetected flows in a DPI system using a machine learning (ML) model. The system may include an input packet module which may be configured for verifying packet parameters from a network traffic flow, and a processor which can be configured for processing the extracted parameters to identify whether the network traffic flow is potentially detectable or undetectable using a trained machine learning (ML) model based on at least the extracted parameters and perform DPI processing for the detectable flows. Thus, the system may provide an optimized DPI flow processing for high rate traffic networks with decreasing processing time.

16 Claims, 5 Drawing Sheets

SYSTEMS AND METHODS FOR PREDICTING UNDETECTABLE FLOWS IN DEEP PACKET INSPECTION

CROSS REFERENCE TO RELATED APPLICATION

This application is based on and derives the benefit of Indian Provisional Application 202141031770, filed Jul. 15, 2021, and Indian Complete Application No. 202141031770, filed Jul. 4, 2022, the contents of which are incorporated herein by reference.

FIELD

Example embodiments disclosed herein relate to wireless network communications, and more particularly to predict potentially undetectable flows in deep packet inspection (DPI) systems using machine learning.

BACKGROUND

Recent 5G enhanced mobile broadband (eMBB) service provides high speed multimedia and streaming data to users. During global COVID pandemic, usage of streaming, voice over internet protocol (VoIP) and virtual meeting applications increased multi-fold and continue to take major chunk of mobile data.

A deep packet inspection (DPI) is a network packet inspection system that examines packet payloads to identify network traffic flows as specific application flows. The DPI solution processes large numbers of network traffic flows simultaneously. Existing DPI systems consume more processing time for network traffic flows which run for more packets and may eventually conclude as undetected. An efficient DPI solution needs to quickly mark known flows and quickly conclude on unknown flows as undetected flow and stop processing those flows.

For example, for each flow, a typical DPI solution would check one or multiple packets from the flow for application detection conclusion. Most DPI solutions would only identify a finite number of applications out of millions of applications. Hence, there is a scope to save critical processing time if one can guess that whether the flow being examined presently belongs to any of such finite numbered applications.

For any DPI solution, it is imperative to be fast, as operators would like to apply policy based control and charging, based on the output. The difference of processing, and thus time taken, for detected and undetected traffic is huge as depicted in table 1.

TABLE 1

| Criteria | Detected traffic | Undetected traffic | % more processing required for undetected traffic |
|---|---|---|---|
| No. of packets processed | Mostly 1 or 2 | Mostly 5-10 | 60-80% |
| No. of bytes processed | Mostly 500 to 1000 | Mostly 6000+ | 60-80% |

From recent customer statistics, around 20-40% flows in live network are found to be marked as undetected flow. If such flows can be identified earlier, then the processing which is carried out over those flows can be saved and extremely high data rates of 5G and next generation networks can be catered.

SUMMARY

In certain example embodiments, there are provided systems and/or methods for predicting potentially undetectable flows in DPI systems, hereby saving processing time.

In certain example embodiments, there are provided systems and/or methods for scanning more traffic in a network flow coming into the system, and facilitating faster data rates.

In certain example embodiments, there are provided systems and/or methods to predict potential undetected flows earlier using a machine learning model.

In certain example embodiments, there are provided systems and/or methods for optimizing DPI flow processing for high rate traffic networks.

In certain example embodiments, there are provided systems and/or methods for optimizing existing DPI system to make it suitable for 5G and next generation networks such that potentially undetected flows can be decided on verifying one or two packets per flow and for potentially detectable flows, a normal DPI processing is carried out which may take more packet processing.

In certain example embodiments, there is provided a system for performing Deep Packet Inspection (DPI) in network traffic. The system may comprise an input packet module, a processor, and an analytics module. The input packet module may be part of the processor in certain example embodiments.

The input packet module may be configured to extract a plurality of parameters from a first set of data packets from a network traffic flow. The first set of data packets from the network traffic flow may include first two non-zero payload packets of the network traffic flow. The plurality of parameters extracted from the first set of data packets may be, but are not limited to, five-tuples, packet payload and other parameters.

In certain example embodiments, a processor may be configured to process the extracted plurality of parameters, identify whether the network traffic flow is potentially detectable or undetectable using a trained machine learning (ML) model based on the extracted plurality of parameters, and perform the DPI processing for the detectable flows. The ML model of the ML engine module may be trained offline with a labelled dataset comprising a plurality of detected and undetected network traffic flows.

The processor may comprise a machine learning (ML) engine module, a DPI engine module, and a fallback module. The ML engine module may be configured to receive the extracted plurality of parameters from the first set of data packets, and identify whether the network traffic flow is potentially detectable or undetectable in terms of probability values to stop processing of the data packets of the undetectable flow. The probability values may be configured as confidence thresholds.

The DPI engine module may be configured to process a plurality of data packets of the network traffic flow and mark the network traffic flow as detected or undetected based on an application signature database. The fallback module may be configured to mark the network traffic flows as detected or undetected using unconventional detection methods and with minimal or reduced processing overhead.

The analytics module may be configured to collect data of current state of the ML engine module, erroneous flow detection results for the network traffic flows, and flow detection results from a live network traffic flow, at pre-defined intervals and/or on pre-defined events occurring.

The current state of the ML engine module may, for example, comprise model parameters, version, and latency statistics. The erroneous flow detection results may comprise at least one of the flows marked as detectable by the ML engine module and eventually undetected by the DPI engine module with parameter metric as a false positive case, and flows marked as undetectable by the ML engine module and eventually detected by the DPI engine module with parameter metric as a false negative case. The flow detection results from the live network traffic flow may comprise at least one true positive case and/or at least one true negative case.

The analytics module may further analyze the collected data and parameters from the live network traffic flow to provide the analyzed data as input to the ML engine module to train and update the ML engine module.

Further, the system with the DPI solution may be equipped on a packet processing node on a network data path. The packet processing node can be, but not limited to, a gateway GPRS support node (GGSN) in a 3G network, a packet data network gateway (PGW) in a 4G network, and a user plane function (UPF) node in a 5G LTE network. The DPI solution can be either integrated in the GGSN, or PGW, or UPF node, or equipped as a stand-alone system on a data or telecom network.

Certain example embodiments herein may provide a method for performing deep packet inspection (DPI). The method may begin with extracting, by the input packet module, a plurality of parameters from a first set of data packets from a network traffic flow. Subsequently, the method may involve processing, by a processor, the extracted plurality of parameters.

Thereafter, the method may involve identifying, by the processor, whether the network traffic flow is potentially detectable or undetectable using a trained machine learning (ML) model based on the extracted plurality of parameters. Later, the method may involve performing, by the processor, the DPI processing for the detectable flows.

Certain example embodiments herein may provide a method for performing network traffic management using a machine learning (ML) based Deep Packet Inspection (DPI) system. The method may begin with monitoring, by the input packet module, a plurality of data packets of a network traffic flow. Subsequently, the method may involve predicting, by the ML engine module, whether the network traffic flows is potentially detectable or undetectable from a first set of data packets using a trained ML model.

Thereafter, the method may involve aborting, by the DPI engine module, processing of the data packets of the network traffic flow, in case the ML engine module predicts that the network traffic flow shall be undetectable by the DPI engine module. Later, the method may involve continuing, by the DPI engine module, processing of the data packets of the network traffic flow, in case the ML engine module predicts that the network traffic flow shall be detectable by the DPI engine module.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Certain example embodiments disclosed herein are illustrated in the accompanying drawings, throughout which like reference letters indicate corresponding parts in the various figures. The example embodiments herein will be better understood from the following description with reference to the drawings, in which.

DETAILED DESCRIPTION

Figure 1:
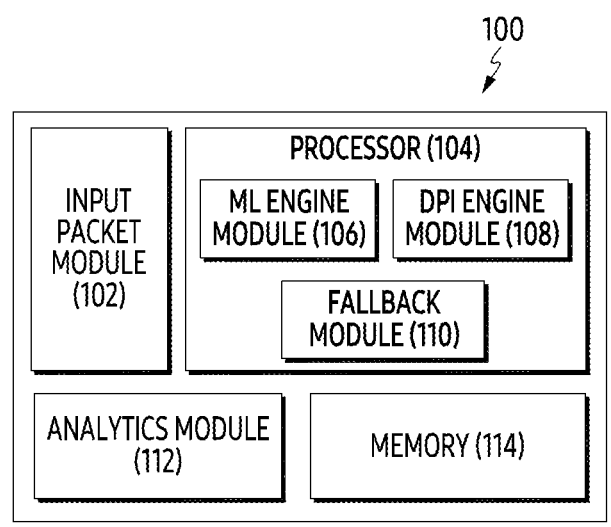
FIG. 1 depicts a system for performing a deep packet inspection (DPI) in a network traffic, according to example embodiments as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Certain example embodiments may achieve an optimized DPI solution which can be deployed in 5G and next generation networks. Referring now to the drawings, and more particularly to FIGS. 1 through 5, where similar reference characters denote corresponding features consistently throughout the figures, there are shown at least one example embodiment. Each embodiment herein may be used in combination with any other embodiment(s) herein.

FIG. 1 depicts a system 100 for performing deep packet inspection (DPI) in network traffic. The system 100 comprises an input packet module 102, at least one processor 104, an analytics module 112 and a memory 114. The processor 104 further comprises a machine learning (ML) engine module 106, a DPI engine module 108 and a fallback module 110. The input packet module 102, analytics module 112, and/or ML engine module 106 may be part of the at least one processor 104 in certain example embodiments. Each "module" herein may comprise circuitry.

In an example embodiment, the system 100 with the DPI solution can be equipped on a packet processing node on a network, e.g., on a data path. For example, in a 3G network, the system 100 can be equipped on a gateway GPRS support node (GGSN). In a 4G network, the system 100 can be equipped on a packet data network gateway (PGW). In a 5G LTE network, the system 100 can be equipped on a user plane function (UPF) node. The system 100 can be enabled to function as a library within a packet processing and forwarding module.

In an example embodiment herein, the DPI feature can reside in the PGW (4G) or UPF (5G) system which allows the data packets to flow between the internet and user equipment (UE). In an embodiment herein, the DPI feature can be inbuilt in the PGW (4G) or UPF (5G) system which allows the data packets to flow between the internet and user equipment (UE). In multi-core or multi-processor PGW/UPF solution, one or more cores can be dedicated for DPI functionality.

In an example embodiment, the input packet module 102 (which may comprise circuitry) can be configured to receive the network traffic flow. On receiving the network flow, the input packet module 102 can extract the packet parameters from a first set of data packets. The first set of data packets from the network traffic flow comprises first two non-zero payload packets of the network traffic flow. The input packet module 102 can be configured to extract a plurality of parameters such as five-tuples, packet payload and other parameters from the first two non-zero payload packets of flow. In an example, consider that the extracted parameters is five-tuples, which may comprise source IP and port, destination IP and port, and transport protocol, which can be extracted from first two non-zero payload packets of the flow.

In an example embodiment, the processor 104 can be configured to process the extracted parameters received from the input packet module 102. These parameters are fed into a trained machine learning (ML) model as input and the ML model gives output in terms of probability value. Thus, the processor 104 can predict whether the network traffic flow is potentially detectable or undetectable using the trained ML model based on the extracted plurality of parameters. The ML model predicts if the flow can be potentially detected or not.

The ML model is trained offline with labelled data samples, various parameters and outcomes as detected or undetected, in an example embodiment. This trained model is used to predict for new flows in live network traffic. If flow parameters are extracted and given as input to this ML model, the ML model outputs the probability of flow being detected and undetected. Based on higher probability among the two outcomes, the flow is treated accordingly. The probability value provided by the ML model denotes confidence percentage in the prediction. Further, the processor 104 performs DPI processing for the detectable flows and aborts DPI processing for the undetectable flows.

In an example embodiment, the ML engine module 106 (which may comprise circuitry) of the processor 104 can be configured to receive the extracted parameters from the input packet module 102 and predict whether the given flow is potentially a detectable flow or an undetectable flow. The ML engine module 106 predicts whether the network traffic flow is potentially detectable or undetectable in terms of probability values to stop processing of the data packets of the undetectable flow. The probability values are configured as confidence thresholds.

For example, if the flow is marked as potentially undetectable, then the flow can be concluded as undetected by the ML engine module 106, and does not allow the undetected flow for DPI processing.

The output derived from the ML engine module 106 is in terms of probability values. The probability value denotes confidence percentage in the prediction, and can be thus considered to be more informative than class labels. The probability values are converted into a binary class label using a threshold.

In an example herein, the configurable threshold can allow tuning of the functioning based on factors such as traffic load. For example, if the system 100 is overloaded with input traffic, detection of the flows can be carried out for which there is a 90% probability of detection, while at leaner times, all the flows with probability higher than 50% can be admitted to the DPI engine module 108 (which may comprise circuitry) for detection.

The ML engine module 106 can be trained with data about which flows were eventually marked as detectable/undetected flows. The trained ML engine module 106 can then predict if the given new flow is potentially an undetectable flow and eventually mark it as undetectable.

The ML engine module 106 can be automatically trained with new applications using a signature database over time. The support for the new applications can be added in the signature database from where this new information can be fed to the training method of the ML engine module 106.

For example, network traffic data in the form of packet capture (PCAP) files can be used for training the ML engine module 106 using supervised learning algorithms Table 2 indicates example testing results with corresponding sample flow results from a test set.

TABLE 2

| S. No. | Flow description | Understanding as per existing solution | Result from existing solution | ML prediction value |
|---|---|---|---|---|
| 1 | UDP flow having encrypted VoIP call data | Should detect if exact app is suppoprted | DISCORD_VOIP | 0.6854 |
| 2 | UDP flow having encrypted VoIP call data | Should detect if exact app is supported | DISCORD_VOIP | 0.6659 |
| 3 | UDP flow having encrypted VoIP call data | Should detect if exact app is supported | DISCORD_VOIP | 0.6659 |
| 4 | DNS flow | Not processed by DPI, hence always undetected | UNDETECTED | 0.0009 |
| 5 | TCP flow, HTTPS protocol | Will always be detected | DISCORD | 0.8617 |

In an embodiment, various ML models utilized by the ML engine module 106 may comprise one or more classification algorithms and regression algorithms Examples of the classification algorithms can be, but not limited to, logistic regression, K-NN, support vector classifier, and MLP classifier. Examples of the regression algorithms can be, but not limited to, MLP regressor, sequential NN, and Xgboost.

Tables 3 and 4 depict example results for classification ML model and regression ML model which are used in the proposed system 100 in accordance with accuracy and latency for predicting potentially undetectable flows.

TABLE 3

| Classification ML Model | Accuracy | Latency (in ms) |
|---|---|---|
| Logistic Regression | 96.1287 | 2 |
| K-NN | 98.2221 | 866.7 |
| Support Vector Classifier | 95.8774 | 1341.9 |
| MLPClassifier | 99.5749 | 17 |

TABLE 4

| Regression ML Model | Loss Function | Loss | Accuracy | Latency (in ms) |
|---|---|---|---|---|
| MLP Regressor | Mean Squared Error | 0.0094 | 99.2 | 18.9 |
| Sequential NN | Binary Cross-entropy | 0.0764 | 98.34 | 1744.9 |
| XGBoost | Logloss | 0.0112 | 99.7 | 8 |

In an embodiment, the DPI engine module 108 can process a plurality of data packets, and detect one or more applications from the detectable flow. The DPI engine module 108 can detect one or more applications from the detectable flow using an application signature database. The application signature database can be pre-configured and can be updated at periodic intervals or on one or more pre-defined events occurring. The DPI engine module 108 can be configured to mark the network traffic flow as detected or undetected based on the application signature database. Each "module" herein may comprise circuitry.

In an example embodiment, the system 100 is further configured to stop examining the packets of the flow if one or more of the following criterion is satisfied. The criterion may comprise:
- If the flow is detected (for most cases, flow is detected in first packet itself),
- If the flow size has reached threshold bytes (example 6000 bytes)
- If maximum packets from the flow are examined (example 30 packets)

Table 5 below depicts an example indicative numbers on how many packets can be inspected for some applications.

TABLE 5

| Application- | Youtube | RTMP | SIP Audio | Naverline call | Skype call |
|---|---|---|---|---|---|
| No. of packets | 1 | 1 | 2 | 3 | 5 |

If flow examination is stopped and no protocol/application is identified for that flow till then, the system 100 may conclude that the flow cannot be detected.

Since, the system 100 uses two packets to conclude on ML prediction and then move on to regular DPI engines, the processing through the ML engine module 106 can be reduced.

In an example embodiment, the fallback module 110 can be configured to prevent or reduce any missed detections at the ML engine module 106. The fallback module 110 can be configured to detect the flow using unconventional detection methods and with minimal or reduced processing to avoid missed detections. Such detection methods can be, but not limited to, DNS/server IP mapping, and control and data flow linking based solution for particular protocols.

In an example embodiment, the analytics module 112 can be configured to collect data of current state of the ML engine module 106. In an embodiment, the analytics module 112 can be configured to collect erroneous flow detection results for the network traffic flows. In an embodiment, the analytics module 112 can be configured to collect flow detection results from a live network traffic flow, at pre-defined intervals and/or on pre-defined events occurring.

Examples of the data collected by the analytics module 112 can be, but not limited to, model parameters, version, latency statistics, and so on. Examples of the erroneous flow detection results comprise at least one of the flows marked as detectable by the ML engine module 106 and eventually undetected by the DPI engine module 108, and flows marked as undetectable by the ML engine module 106 and eventually detected by the DPI engine module 108. The flows that are marked as detectable by the ML engine module 106 and eventually undetected by the DPI engine module 108, can be indicated with a parameter metric as a false positive case. The flows that are marked as undetectable by the ML engine module 106 and eventually detected by the DPI engine module 108 can be indicated with a parameter metric as a false negative case. The flow detection results from the live network traffic flow comprise at least one true positive case and at least one true negative case.

The analytics module 112 can be configured to analyse the collected data such as current state of the ML engine module 106, erroneous flow detection results, flow detection results from a live network traffic and parameters from the live network traffic, and detect results to provide feedback. Analysis of the collected data includes, but not limited to, statistics about the false positive or false negative cases, true positive or negative cases, overall counters, overall model accuracy etc. This data is used for generating reports. Further, accurate data can also be used to disable ML model, if the accuracy is less than configured threshold (example, <50%).

The feedback is connected to the ML engine module 106 to train and update the module. Further, the feedback from the analytics module 112 can be connected to the ML engine module 106 through a refining module to refine the collected data at pre-defined intervals and/or on pre-defined events occurring. For refinement, new data samples with false positive and false negative cases as well as true positive or true negative cases are used to train the model further so that the model is more realistic with live data and would perform better for false positive and false negative cases in the next run. The newly trained model will be deployed at pre-defined intervals/events.

In an example embodiment, the memory 114 can be configured to store the trained model at runtime, to ensure that the current ML model being used can be updated without need for a system downtime. The memory 114 can have two memory banks such as active and standby.

In an example embodiment, the processor 104 can be at least one of a single processer, a plurality of processors, multiple homogeneous or heterogeneous cores, multiple Central Processing Units (CPUs) of different kinds, micro-controllers, special media, and other accelerators. The processor 104 may be an application processor (AP), or the like, a graphics-only processing unit such as a graphics processing unit (GPU), a visual processing unit (VPU), and/or an Artificial Intelligence (AI)-dedicated processor such as a neural processing unit (NPU). Each "unit" herein may comprise circuitry.

In an example embodiment, the at least one processor 104 (including processing circuitry) can be configured to execute instructions stored in the memory 114. The memory 114 may comprise one or more volatile and non-volatile memory components which are capable of storing data and instructions to be executed.

Examples of the memory 114 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory 114 may also include one or more computer-readable storage media. The memory 114 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 114 may, in some examples, be considered a non-transitory storage medium. The term "non-transitory" may indicate that the storage medium is not embodied in a carrier wave or a propagated signal. However, the term "non-transitory" should not be interpreted to mean that the memory 114 is non-movable. In certain examples, a non-transitory storage medium may store data that can, over time, change (e.g., in Random Access Memory (RAM) or cache).

FIG. 1 shows example units of the system 100, but it is to be understood that other embodiments are not so limited. In other embodiments, the system 100 may include less or more number of units. Further, the labels or names of the units are used only for illustrative purpose and does not limit the scope of the invention. One or more units can be combined together to perform same or substantially similar function in the system 100.

Figure 2:
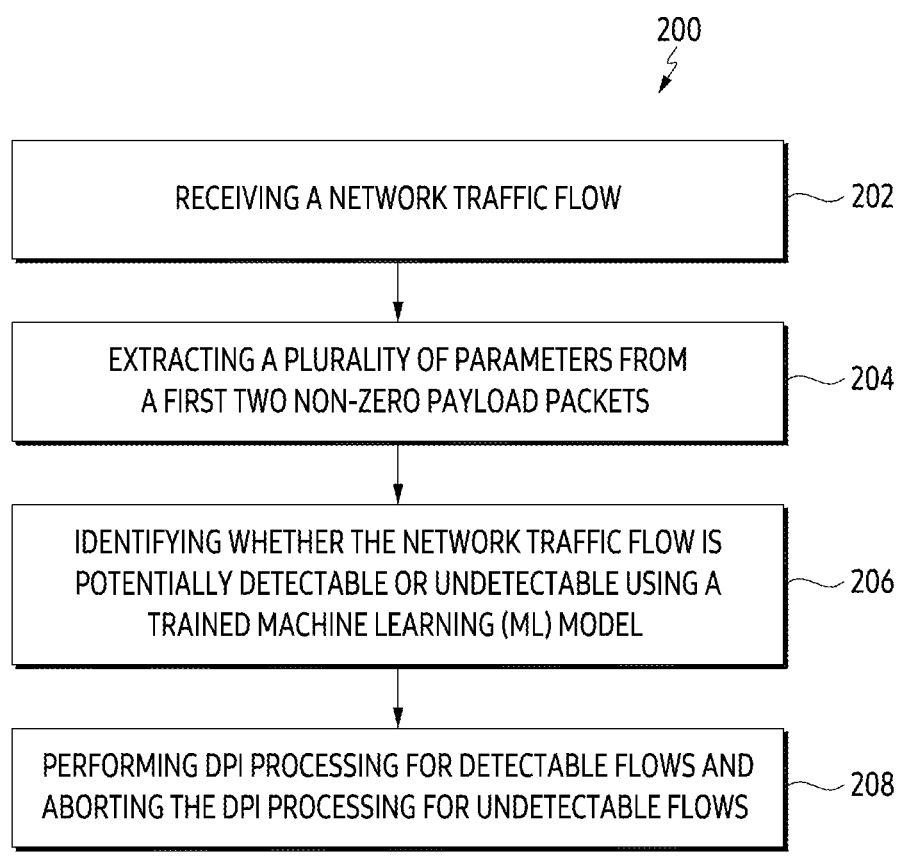
FIG. 2 depicts a method for performing DPI, according to example embodiments as disclosed herein.

FIG. 2 depicts a method 200 for performing DPI. The method 200 begins with receiving, by the input packet module, the network traffic flow and extracting the packet parameters from a first two non-zero payload packets from a network traffic flow, as depicted in step 202. Subsequently, the method 200 discloses extracting, by the input packet module, five-tuples, packet payload and other parameters from the first two non-zero payload packets of flow, as depicted in step 204. The five-tuples may comprise source IP and port, destination IP and port, and transport protocol.

Thereafter, the method 200 discloses predicting, by the processor, whether the given flow is potentially a detectable flow or an undetectable flow with probability values using a trained machine learning (ML) model based on the extracted plurality of parameters, as depicted in step 206. The trained ML model provides an output for the flow that can be potentially detectable by the DPI engine module or not.

Later, the method 200 discloses performing, by the processor, the DPI processing for the detectable flows and aborting the DPI processing for the undetectable flows, as depicted in step 208.

The various actions in method 200 may be performed in the order presented, in a different order or simultaneously. Further, in some embodiments, some actions listed in FIG. 2 may be omitted.

Figure 3:
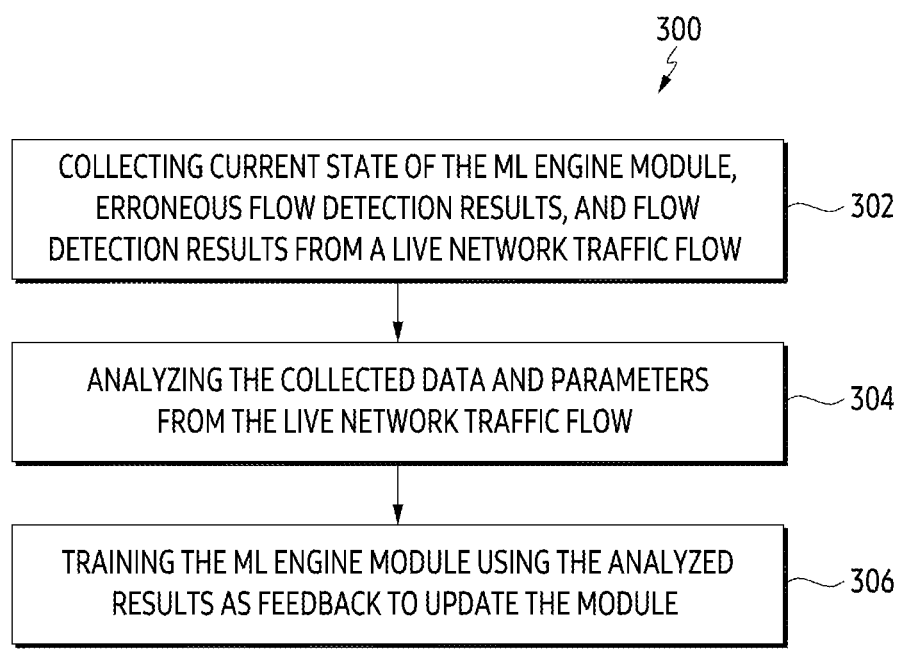
FIG. 3 depicts a method for training the ML engine module using the analytics module of the system, according to example embodiments as disclosed herein.

FIG. 3 depicts a method 300 for training the ML engine module using the analytics module of the system. The method 300 begins with collecting current state of the ML engine module, erroneous flow detection results for the network traffic flows, and flow detection results from a live network traffic flow, at pre-defined intervals and/or on pre-defined events occurring, as depicted in step 302. The current state of the ML engine module 106 comprises model parameters, version, and latency statistics. The erroneous flow detection results comprise at least one of the flows marked as detectable by the ML engine module 106 and eventually undetected by the DPI engine module 108 with parameter metric as a false positive case, and flows marked as undetectable by the ML engine module 106 and eventually detected by the DPI engine module 108 with parameter metric as a false negative case. The flow detection results from the live network traffic flow comprise a true positive case and a true negative case.

Subsequently, the method 300 discloses analyzing the collected data and parameters from the live network traffic flow with corresponding parameter metrics, as depicted in step 304. Thereafter, the method 300 discloses training the ML engine module using the analyzed results as feedback to update the module, as depicted in step 306.

Further, the analytics module 112 of the system 100 can train a new model offline either periodically or once false cases hit a specific threshold, and share the trained model with the ML engine module 106. The ML model of the ML engine module 106 may be trained offline with a labelled dataset comprising a plurality of detected and undetected network traffic flows.

The various actions in method 300 may be performed in the order presented, in a different order or simultaneously. Further, in some embodiments, some actions listed in FIG. 3 may be omitted.

Figure 4:
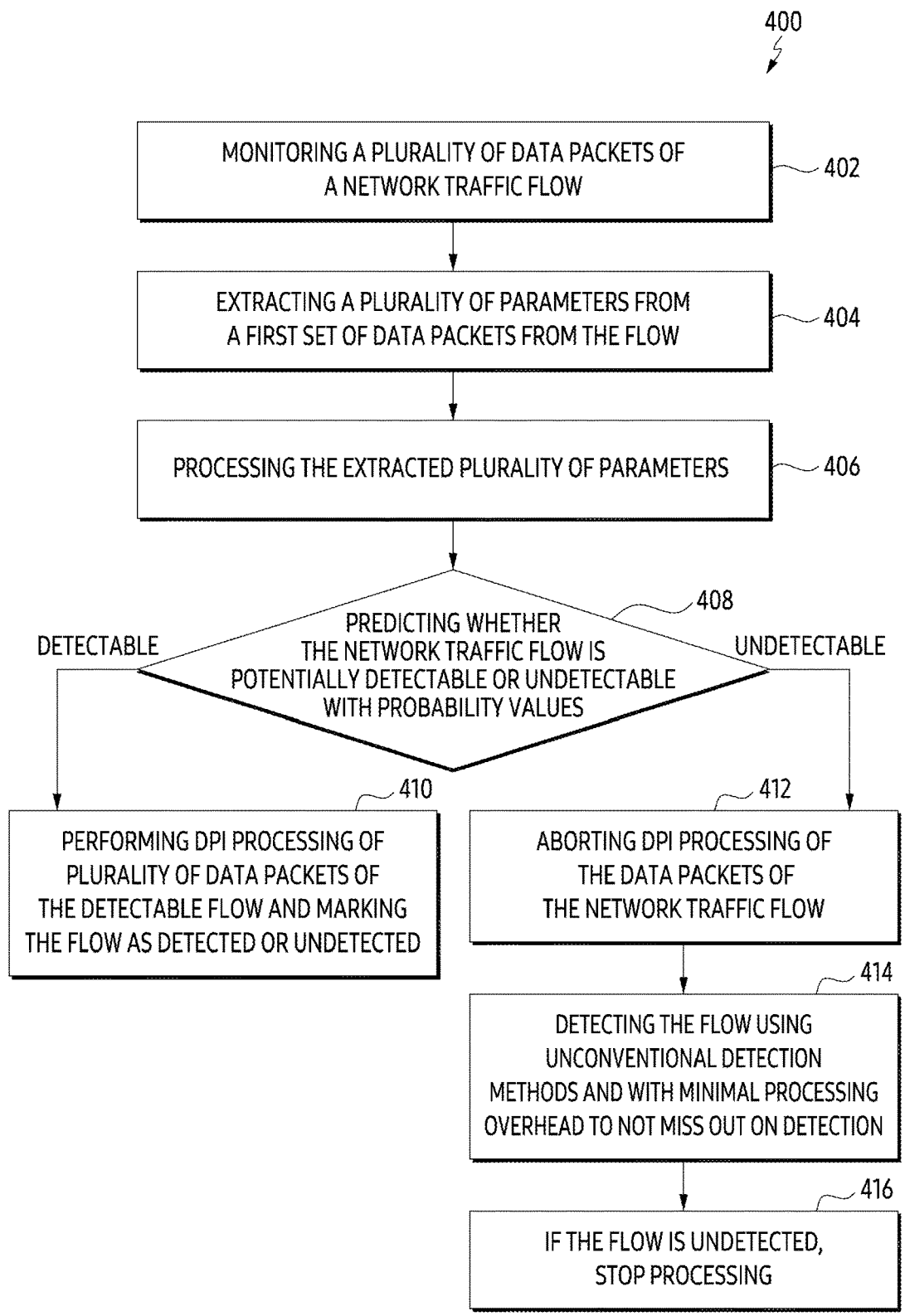
FIG. 4 depicts a method for performing network traffic management using the proposed ML based DPI system, according to example embodiments as disclosed herein.

FIG. 4 depicts an example method 400 for performing network traffic management using the proposed ML based DPI system. The method 400 begins with monitoring, by the input packet module, a plurality of data packets of a network traffic flow, as depicted in step 402. Subsequently, the method 400 discloses extracting, by the input packet module, a plurality of parameters from a first set of data packets from the flow, as depicted in step 404.

Thereafter, the method 400 discloses processing, by the processor, the extracted plurality of parameters, as depicted in step 406. Later, the method 400 discloses predicting, by the ML engine module, whether the network traffic flow is potentially detectable or undetectable from a first set of data packets using a trained ML model, as depicted in step 408. The prediction of the network traffic flow is depicted with probability values.

Subsequently, if detectable or potentially detectable, the method 400 discloses continuing, by the DPI engine module, DPI processing of the data packets of the network traffic flow in case the ML engine module predicts that the network traffic flow shall be detectable by the DPI engine module, as depicted in step 410. Further, the flow is marked as detected if the flow is detected, and the flow is marked as undetected if the flow is undetected.

If undetectable at 408, the method 400 discloses aborting, by the DPI engine module, processing of the data packets of the network traffic flow, in case the ML engine module predicts that the network traffic flow shall be undetectable by the DPI engine module, as depicted in step 412.

Thereafter, the method 400 discloses detecting, by the fallback module, the flow once again to not miss out on detections and marking the flow as detected or undetected, as depicted in step 414. The fallback module marks the network traffic flows as detected or undetected using unconventional detection methods and with minimal or reduced processing overhead. If the flow is undetected, the processing is stopped, as depicted in step 416.

The various actions in method 400 may be performed in the order presented, in a different order or simultaneously. Further, in some embodiments, some actions listed in FIG. 4 may be omitted.

Embodiments disclosed herein can be implemented through at least one software program running on at least one hardware device and performing network management functions to control the elements. The elements shown in FIG. 1 can be at least one of a hardware device, or a combination of hardware device and software module.

Figure 5:
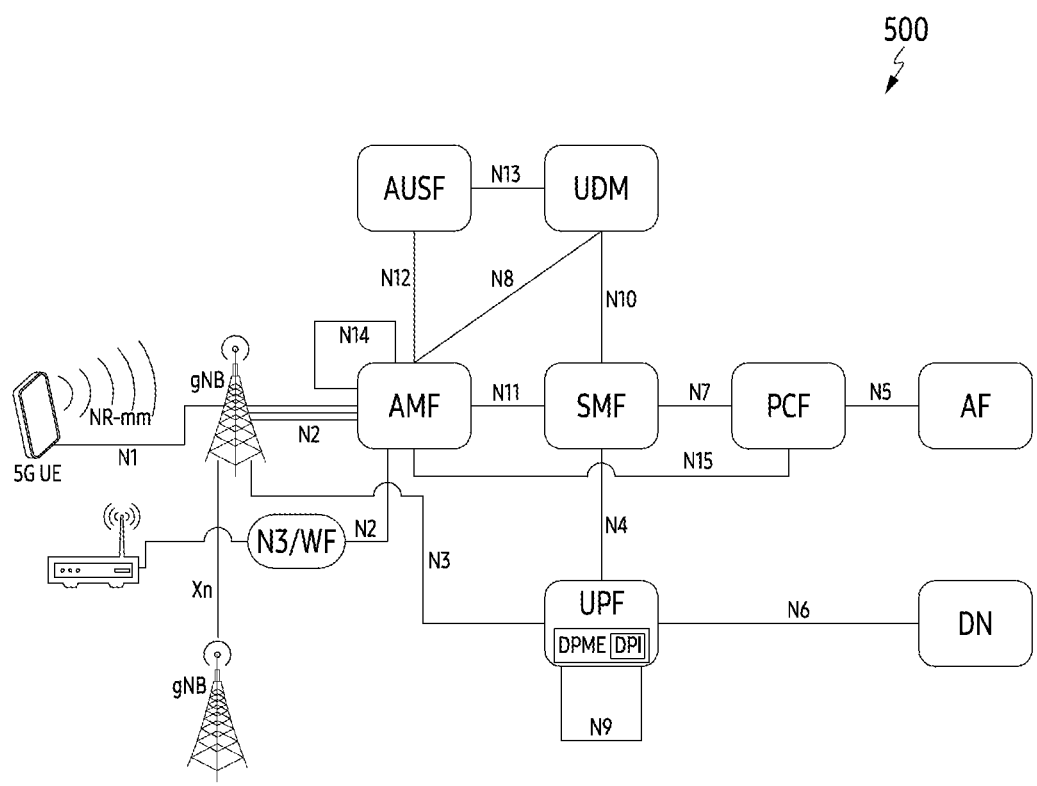
FIG. 5 depicts the proposed DPI system on a communication system, according to example embodiments as disclosed herein.

FIG. 5 depicts the proposed DPI system on a communication system 500. The proposed DPI system can be configured on the packet processing node on a network, e.g., as a stand-alone system on a data or telecom network. On a 3G network, the packet processing node would be the GGSN node; on a 4G network, the packet processing node would be the PGW; on a 5G LTE network, the packet processing node would be the UPF node, and so on.

Further, the trained ML model which is trained offline can be integrated as part of the proposed DPI system, so that the system can be used to test live network traffic flow.

Thus, the system 100 detects the flow in one or two non-zero payload packets. Therefore, two packet input to the ML model is optimal from accuracy and performance viewpoint. This data packet limit can be varied further using a different application database. This optimized DPI system detects the flow using one or two packets per flow without compromising on accuracy. The system provides around 40-60% optimization for processing undetected flows with more than 98% of accuracy.

The DPI system processing time can also be enhanced, along with faster data rates. By identifying potentially undetected flows early, the DPI system processing time can be saved for flows which run for more packets and eventually concluded as undetected. The system can scan more of the network traffic flow, and maintain the faster data rates.

Throughput is one of the critical KPIs for any core network solution and PGW/UPF with high throughput can have high impact on overall selection of DPI solution by operators. With the proposed system, few DPI cores can be used to enhance UPF throughput to even higher value.

According to embodiments, a system for performing deep packet inspection (DPI) in network traffic, comprises an input packet module, comprising circuitry, configured to extract a plurality of parameters from a first set of data packets from a network traffic flow. The system for performing the DPI in network traffic comprises at least one processor configured to process the extracted plurality of parameters, predict whether the network traffic flow is potentially detectable or undetectable using a trained machine learning (ML) model based on the extracted plurality of parameters, and perform the DPI processing for the detectable flows.

In example embodiments, the first set of data packets from the network traffic flow comprises first two non-zero payload packets of the network traffic flow.

In example embodiments, the plurality of parameters extracted from the first set of data packets comprise at least one of five-tuples, packet payload and other parameters.

In example embodiments, the processor comprises a machine learning (ML) engine module, comprising circuitry, configured to receive the extracted plurality of parameters from the first set of data packets. The ML engine module configured to predict whether the network traffic flow is potentially detectable or undetectable in terms of probability values to stop processing of the data packets of the undetectable flow, and wherein the probability values are configured as confidence thresholds. The processor comprises a DPI engine module, comprising circuitry, configured to process a plurality of data packets of the network traffic flow and mark the network traffic flow as detected or undetected based on an application signature database. The processor comprises a fallback module, comprising circuitry, configured to mark the network traffic flows as detected or undetected.

In example embodiments, the system comprises an analytics module, comprising circuitry, configured to collect data of current state of the ML engine module, erroneous flow detection results for the network traffic flows, and flow detection results from a live network traffic flow, at pre-defined intervals and/or on pre-defined events occurring. The analytics module configured to analyze the collected data and parameters from the live network traffic flow to provide the analyzed data as input to the ML engine module to train and update the ML engine module.

In example embodiments, the current state of the ML engine module comprises model parameters, version, and latency statistics.

In example embodiments, the erroneous flow detection results comprise at least one of the flows marked as detectable by the ML engine module and eventually undetected by the DPI engine module with parameter metric as a false positive case, and flows marked as undetectable by the ML engine module and eventually detected by the DPI engine module with parameter metric as a false negative case.

In example embodiments, the flow detection results from the live network traffic flow comprise at least one true positive case and at least one true negative case.

In example embodiments, the system with the DPI solution is equipped on a packet processing node on a network data path, wherein the packet processing node comprises at least one of: a gateway GPRS support node (GGSN) in a 3G network, a packet data network gateway (PGW) in a 4G network, and a user plane function (UPF) node in a 5G LTE network.

In example embodiments, the DPI solution is at least one of: integrated in the GGSN, or PGW, or UPF node, or equipped as a stand-alone system on a data or telecom network.

In example embodiments, the ML model of the ML engine module is trained offline with a labelled dataset comprising a plurality of detected and undetected network traffic flows.

According to embodiments, a method for performing deep packet inspection (DPI), the method comprises extracting a plurality of parameters from a first set of data packets from a network traffic flow. the method comprises processing, by at least one processor, the extracted plurality of parameters. The method comprises predicting, by the at least one processor, whether the network traffic flow is potentially detectable or undetectable using a trained machine learning (ML) model based on the extracted plurality of parameters. The method comprises performing, by the at least one processor, the DPI processing for the detectable flows.

In example embodiments, the first set of data packets from the network traffic flow comprises first two non-zero payload packets of the network traffic flow.

In example embodiments, the plurality of parameters extracted from the first set of data packets comprise at least one of five-tuples, packet payload and other parameters.

In example embodiments, the method comprises receiving the extracted plurality of parameters from the first set of data packets. the method comprises predicting whether the network traffic flow is potentially detectable or undetectable in terms of probability values to stop processing of the data packets of the undetectable flow, and wherein the probability values are configured as confidence thresholds. The method comprises processing a plurality of data packets of the network traffic flow and marking the network traffic flow as detected or undetected based on an application signature database. The method comprises marking the network traffic flows as detected or undetected.

In example embodiments, the method comprises: collecting data of current state of an ML engine module, erroneous flow detection results for the network traffic flows, and flow detection results from a live network traffic flow, at pre-defined intervals and/or on pre-defined events occurring. The method comprises analyzing the collected data and parameters from the live network traffic flow to provide the analyzed data to train and update the ML engine module.

In example embodiments, the current state of the ML engine module comprises model parameters, version, and latency statistics.

In example embodiments, the erroneous flow detection results comprise at least one of the flows marked as detectable by the ML engine module and eventually undetected by the DPI engine module with parameter metric as a false positive case, and flows marked as undetectable by the ML engine module and eventually detected by the DPI engine module with parameter metric as a false negative case.

In example embodiments, the flow detection results from the live network traffic flow comprise at least one true positive case and at least one true negative case.

In example embodiments, the method comprises equipping a system with the DPI solution on a packet processing node on a network data path, wherein the packet processing node comprises at least one of: a gateway GPRS support node (GGSN) in a 3G network, a packet data network gateway (PGW) in a 4G network, and a user plane function (UPF) node in a 5G LTE network.

In example embodiments, the method comprises integrating the DPI solution in at least one of: the GGSN, or PGW, or UPF node, or equipping the DPI solution as a stand-alone system on a data or telecom network.

In example embodiments, the ML model is trained offline with a labelled dataset comprising a plurality of detected and undetected network traffic flows.

According to embodiments, a method for performing network traffic management using a machine learning (ML) based deep packet inspection (DPI) system, the method comprises monitoring a plurality of data packets of a network traffic flow. The method comprises predicting whether the network traffic flow is potentially detectable or undetectable from a first set of data packets using a trained ML model. The method comprises aborting processing of the data packets of the network traffic flow, in case of predicting that the network traffic flow is undetectable. The method comprises continuing processing of the data packets of the network traffic flow, in case of predicting that the network traffic flow is detectable.

According to embodiments, a system for performing deep packet inspection (DPI) in network traffic, comprises an input packet module, comprising circuitry, configured to extract a plurality of parameters from a first set of data packets from a network traffic flow. The system for performing the DPI in network traffic comprises at least one processor configured to process the extracted plurality of parameters, predict whether the network traffic flow is potentially detectable or undetectable using a trained machine learning (ML) model based on the extracted plurality of parameters, and perform the DPI processing for the detectable flows.

In example embodiments, the first set of data packets from the network traffic flow comprises first two non-zero payload packets of the network traffic flow.

In example embodiments, the plurality of parameters extracted from the first set of data packets comprise at least one of five-tuples, packet payload and other parameters.

In example embodiments, the processor comprises a machine learning (ML) engine module, comprising circuitry, configured to receive the extracted plurality of parameters from the first set of data packets. The ML engine module configured to predict whether the network traffic flow is potentially detectable or undetectable in terms of probability values to stop processing of the data packets of the undetectable flow, and wherein the probability values are configured as confidence thresholds. The processor comprises a DPI engine module, comprising circuitry, configured to process a plurality of data packets of the network traffic flow and mark the network traffic flow as detected or undetected based on an application signature database. The processor comprises a fallback module, comprising circuitry, configured to mark the network traffic flows as detected or undetected.

In example embodiments, the system comprises an analytics module, comprising circuitry, configured to collect data of current state of the ML engine module, erroneous flow detection results for the network traffic flows, and flow detection results from a live network traffic flow, at pre-defined intervals and/or on pre-defined events occurring. The analytics module configured to analyze the collected data and parameters from the live network traffic flow to provide the analyzed data as input to the ML engine module to train and update the ML engine module.

In example embodiments, the current state of the ML engine module comprises model parameters, version, and latency statistics.

In example embodiments, the erroneous flow detection results comprise at least one of the flows marked as detectable by the ML engine module and eventually undetected by the DPI engine module with parameter metric as a false positive case, and flows marked as undetectable by the ML engine module and eventually detected by the DPI engine module with parameter metric as a false negative case.

In example embodiments, the flow detection results from the live network traffic flow comprise at least one true positive case and at least one true negative case.

In example embodiments, the system with the DPI solution is equipped on a packet processing node on a network data path, wherein the packet processing node comprises at least one of: a gateway GPRS support node (GGSN) in a 3G network, a packet data network gateway (PGW) in a 4G network, and a user plane function (UPF) node in a 5G LTE network.

In example embodiments, the DPI solution is at least one of: integrated in the GGSN, or PGW, or UPF node, or equipped as a stand-alone system on a data or telecom network.

In example embodiments, the ML model of the ML engine module is trained offline with a labelled dataset comprising a plurality of detected and undetected network traffic flows.

According to embodiments, a method for performing deep packet inspection (DPI), the method comprises extracting a plurality of parameters from a first set of data packets from a network traffic flow. the method comprises processing, by at least one processor, the extracted plurality of parameters. The method comprises predicting, by the at least one processor, whether the network traffic flow is potentially detectable or undetectable using a trained machine learning (ML) model based on the extracted plurality of parameters. The method comprises performing, by the at least one processor, the DPI processing for the detectable flows.

In example embodiments, the first set of data packets from the network traffic flow comprises first two non-zero payload packets of the network traffic flow.

In example embodiments, the plurality of parameters extracted from the first set of data packets comprise at least one of five-tuples, packet payload and other parameters.

In example embodiments, the method comprises receiving the extracted plurality of parameters from the first set of data packets. the method comprises predicting whether the network traffic flow is potentially detectable or undetectable in terms of probability values to stop processing of the data packets of the undetectable flow, and wherein the probability values are configured as confidence thresholds. The method comprises processing a plurality of data packets of the network traffic flow and marking the network traffic flow as detected or undetected based on an application signature database. The method comprises marking the network traffic flows as detected or undetected.

In example embodiments, the method comprises: collecting data of current state of an ML engine module, erroneous flow detection results for the network traffic flows, and flow detection results from a live network traffic flow, at pre-defined intervals and/or on pre-defined events occurring. The method comprises analyzing the collected data and parameters from the live network traffic flow to provide the analyzed data to train and update the ML engine module.

In example embodiments, the current state of the ML engine module comprises model parameters, version, and latency statistics.

In example embodiments, the erroneous flow detection results comprise at least one of the flows marked as detectable by the ML engine module and eventually undetected by the DPI engine module with parameter metric as a false positive case, and flows marked as undetectable by the ML engine module and eventually detected by the DPI engine module with parameter metric as a false negative case.

In example embodiments, the flow detection results from the live network traffic flow comprise at least one true positive case and at least one true negative case.

In example embodiments, the method comprises equipping a system with the DPI solution on a packet processing node on a network data path, wherein the packet processing node comprises at least one of: a gateway GPRS support node (GGSN) in a 3G network, a packet data network gateway (PGW) in a 4G network, and a user plane function (UPF) node in a 5G LTE network.

In example embodiments, the method comprises integrating the DPI solution in at least one of: the GGSN, or PGW, or UPF node, or equipping the DPI solution as a stand-alone system on a data or telecom network.

In example embodiments, the ML model is trained offline with a labelled dataset comprising a plurality of detected and undetected network traffic flows.

According to embodiments, a method for performing network traffic management using a machine learning (ML) based deep packet inspection (DPI) system, the method comprises monitoring a plurality of data packets of a network traffic flow. The method comprises predicting whether the network traffic flow is potentially detectable or undetectable from a first set of data packets using a trained ML model. The method comprises aborting processing of the data packets of the network traffic flow, in case of predicting that the network traffic flow is undetectable. The method comprises continuing processing of the data packets of the network traffic flow, in case of predicting that the network traffic flow is detectable.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A system for performing deep packet inspection (DPI) processing to detect at least one defined application flow in network traffic, comprising:
   an analytics module, comprising circuitry, configured to:
      collect data including erroneous flow detection results for network traffic flows and flow detection results from a live network traffic flow, and
      train and update a machine learning (ML) model based on the collected data;
   an input packet module, comprising circuitry, configured to extract a plurality of parameters from a first set of data packets from a network traffic flow; and
   at least one processor, comprising processing circuitry, configured to:
      determine whether the network traffic flow is potentially detectable or undetectable under the DPI processing using the ML model based on the extracted plurality of parameters,
      in accordance with a determination that the network traffic flow is potentially detectable under the DPI processing, perform the DPI processing for the detectable network traffic flow, and
      in accordance with a determination that the network traffic flow is undetectable under the DPI processing, abort the DPI processing for the undetectable network traffic flow,
   wherein the erroneous flow detection results comprise at least one of:
      flows marked as detectable by the ML model and eventually undetected by the DPI processing with parameter metric as a false positive case, or
      flows marked as undetectable by the ML model and eventually detected by the DPI processing with parameter metric as a false negative case.

2. The system as claimed in claim 1, wherein the first set of data packets from the network traffic flow comprises first two non-zero payload packets of the network traffic flow.

3. The system as claimed in claim 2, wherein the plurality of parameters extracted from the first set of data packets comprise a source internet protocol (IP), a source port, a destination IP, a destination port, and transport protocol.

4. The system as claimed in claim 1, wherein the processor comprises:
   a ML engine module, comprising at least one circuitry, configured to:
      receive the extracted plurality of parameters from the first set of data packets; and
      predict whether the network traffic flow is potentially detectable or undetectable in terms of probability values to stop processing of the data packets of the undetectable flow, wherein the probability values are configured as confidence thresholds;
   a DPI engine module, comprising at least one circuitry, configured to process a plurality of data packets of the network traffic flow and mark the network traffic flow as detected or undetected based on an application signature database; and
   a fallback module, comprising at least one circuitry, configured to mark at least one network traffic flows as detected or undetected.

5. The system as claimed in claim 1,
   wherein the data further includes a current state of an ML engine module comprising the ML model, and wherein the current state of the ML engine module comprises model parameters, version, and latency statistics.

6. The system as claimed in claim 1, wherein the flow detection results from the live network traffic flow comprise at least one true positive case and at least one true negative case.

7. The system as claimed in claim 1,
wherein the system with the DPI processing is equipped on a packet processing node on a network data path, and
wherein the packet processing node comprises at least one of: a gateway general packet radio service (GPRS) support node (GGSN) in a $3^{rd}$ generation (3G) network, a packet data network gateway (PGW) in a $4^{th}$ generation (4G) network, and a user plane function (UPF) node in a $5^{th}$ generation (5G) network.

8. The system as claimed in claim 7, wherein a device for the DPI processing is integrated in the GGSN, or PGW, or UPF node, or is equipped as a stand-alone system on a data or telecom network.

9. A method for performing deep packet inspection (DPI) processing to detect at least one defined application flow, the method comprising:
collecting data including erroneous flow detection results for network traffic flows and flow detection results from a live network traffic flow, and
training and updating a machine learning (ML) model based on the collected data;
extracting a plurality of parameters from a first set of data packets from a network traffic flow;
determining, by at least one processor, whether the network traffic flow is potentially detectable or undetectable using the ML model based on the extracted plurality of parameters;
in accordance with a determination that the network traffic flow is potentially detectable under the DPI processing, performing, by the at least one processor, the DPI processing for the detectable network traffic flow; and
in accordance with a determination that the network traffic flow is undetectable under the DPI processing, aborting the DPI processing for the undetectable network traffic flow,
wherein the erroneous flow detection results comprise at least one of:
flows marked as detectable by the ML model and eventually undetected by the DPI processing with parameter metric as a false positive case, or
flows marked as undetectable by the ML model and eventually detected by the DPI processing with parameter metric as a false negative case.

10. The method as claimed in claim 9, wherein the first set of data packets from the network traffic flow comprises first two non-zero payload packets of the network traffic flow.

11. The method as claimed in claim 10, wherein the plurality of parameters extracted from the first set of data packets comprise a source internet protocol (IP), a source port, a destination IP, a destination port, and transport protocol.

12. The method as claimed in claim 9,
wherein the determination of whether the network traffic flow is potentially detectable or undetectable is performed in terms of probability values to stop processing of the data packets of the undetectable flow, and
wherein the probability values are configured as confidence thresholds.

13. The method of claim 9 wherein the data further includes a current state of an ML engine module comprising the ML model, and
wherein the current state of the ML engine module comprises model parameters, version, and latency statistics.

14. The method as claimed in claim 9, wherein the flow detection results from the live network traffic flow comprise at least one true positive case and at least one true negative case.

15. The method as claimed in claim 9,
wherein the method comprises equipping a system with the DPI solution on a packet processing node on a network data path, and
wherein the packet processing node comprises at least one of: a gateway general packet radio service (GPRS) support node (GGSN) in a $3^{rd}$ generation (3G) network, a packet data network gateway (PGW) in a $4^{th}$ generation (4G) network, and a user plane function (UPF) node in a $5^{th}$ generation (5G) network.

16. The method as claimed in claim 15, wherein a device for the DPI processing is integrated in the GGSN, or PGW, or UPF node, or is equipped as a stand-alone system on a data or telecom network.

* * * * *